United States Patent

[11] 3,578,366

[72] Inventor Edward A. Snidar
    Ann Arbor, Mich.
[21] Appl. No. 880,646
[22] Filed Nov. 28, 1969
[45] Patented May 11, 1971
[73] Assignee O & S Bearing & Mfg. Co.
    Whitemore Lake, Mich.

[54] BALL JOINT SELF-SEALING BEARING
    8 Claims, 7 Drawing Figs.
[52] U.S. Cl. .................................................... 287/90,
    308/72
[51] Int. Cl. ..................................................... F16c 11/06
[50] Field of Search ............................................ 287/90 (A),
    87, 90 (C), 88; 308/72

[56] References Cited
    UNITED STATES PATENTS
2,544,582  3/1951  Booth ............................ 308/72X
2,814,538  11/1957 Connolly ....................... 308/72
2,973,980  3/1961  Vogt et al. ..................... 287/87
3,073,634  1/1963  Gottschald ................... 287/90C
3,160,430  12/1964 Gottschald ................... 287/87
3,259,408  7/1966  Herbenar ...................... 308/72X
3,273,924  9/1966  Maxeiner ...................... 287/90A
3,451,701  6/1969  Smith ............................ 287/90A FOREIGN PATENTS
827,333    2/1960  Great Britain ............... 287/90C
1,373,761  8/1964  France .......................... 308/72

Primary Examiner—David J. Williamowsky
Assistant Examiner—Andrew V. Kundrat
Attorney—Barnes, Kisselle, Raisch and Choate ABSTRACT: A long-life, self-lubricating, self-sealing bearing which utilizes a plastic insert assembly for carrying the bearing load backed up by a lubricant-impregnated material to serve as a resilient compression force in the bearing assembly and as a source of lubricant during the life of the bearing, the plastic assembly being formed of interlocking parts which provide a substantial body of load-carrying material at the equatorial surface of the joint and at the same time provides a resilient lip seal at each end of the joint to exclude contaminant material.

PATENTED MAY 11 1971  3,578,366
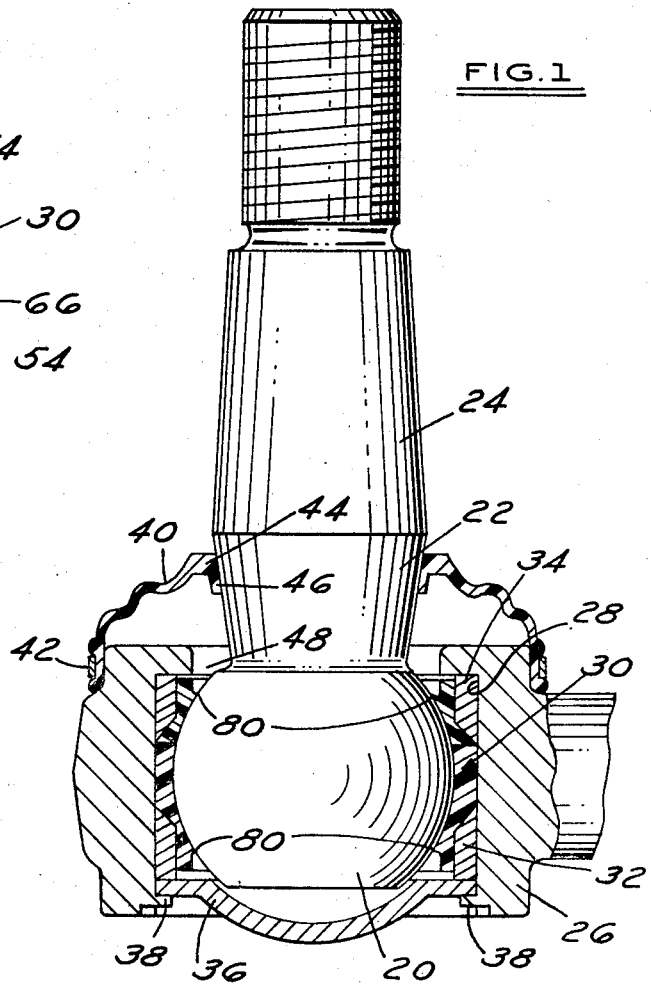
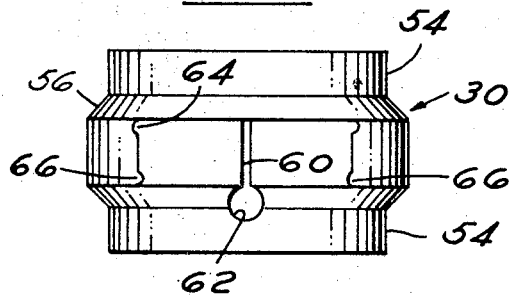
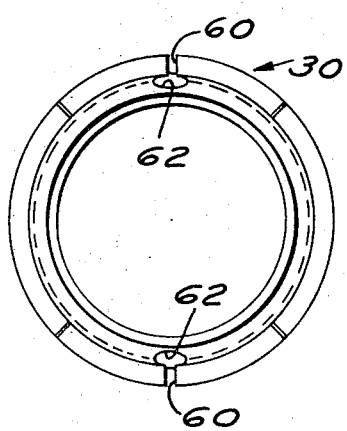
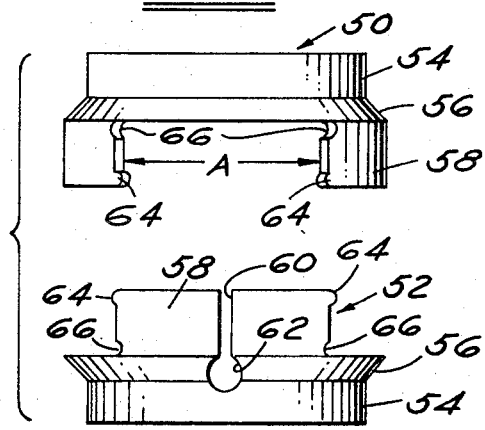
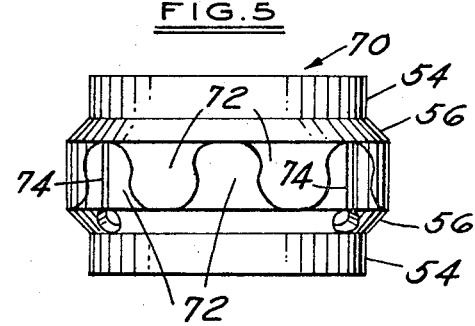
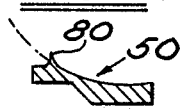
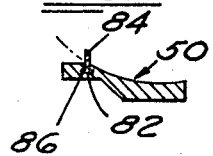
INVENTOR.
EDWARD A. SNIDAR
BY
Barnes, Kisselle,
Raisch & Choate.
ATTORNEYS

BALL JOINT SELF-SEALING BEARING

This invention relates to a ball joint, self-sealing bearing and more particularly to a ball and socket joint utilizing a plastic bearing surface surrounding the metal ball.

Vehicle joints for steering assemblies have frequently used a combination of steel and formed parts, sometimes utilizing powdered metal parts to form a bearing, the joints being lubricated by the so-called Alemite system wherein contaminants would be flushed out by the lubrication of the joint and a fresh supply of lubricant could be introduced at reasonable intervals.

The present invention contemplates the use of a joint which is intended to last for the lifetime of a vehicle, for example, without lubrication except that which is initially enclosed in the joint when it is first manufactured. With this type of joint, the sealing of the joint against contaminants such as dust, water and other abrasive materials is extremely important since the plastic seat used in this type of joint will have a much shorter life when subjected to these contaminants.

The present invention contemplates a self-lubricating ball joint which is formed of interfitting plastic parts which can be assembled around the ball and held in place by suitable housing parts and by a lubricant reservoir of fibrous material.

In addition to an outer flexible seal which is utilized to enclose the space between the socket housing and the ball stud, a supplemental inner seal is contemplated which serves as a secondary insurance against the introduction of contaminants. The present construction is intended to be an improvement on the integral seal system shown in U.S. patents to Connolly, U.S. Pat. No. 2,814,538, dated Nov. 26, 1957 and 2,881,032, dated Apr. 7, 1959, and the seal shown in a U.S. patent to Kogstrom, U.S. Pat. No. 2,921,809, dated Jan. 19, 1960.

The present invention contemplates the use of a pair of interfitting plastic shells which can be assembled on the ball from opposite poles to interlock and form a spherical recess for the ball and bring the sealing portions which are carried by the outer ends of the assembled shells into pressure contact with the ball in the areas where contaminants may enter. It is, therefore, an object of the invention to provide a composite plastic load-bearing member for a ball and socket joint which interlocks around the ball and carries an inherent seal.

It is a further object to provide an interlocking plastic bearing element which provides maximum load-bearing material at the major load-bearing surface of the ball, while permitting a telescoping interlock between the parts forming the bearing.

It is a further object to provide a ball and socket joint with a plastic seat wherein an outer lip seal carried by the seat serves not only to wipe contaminants that might enter the ball joint but also serves as a lubricant-retaining seal.

Other objects and features of the invention will be apparent in the following description and claims wherein the principles of operation and the manner of use of the invention are set forth together with the best mode of the invention presently contemplated.

Drawings accompany the disclosure and the various views thereof may be briefly described as:

FIG. 1, a sectional view of a ball and socket joint illustrating the parts in assembly.

FIG. 2, a side elevation of he plastic liner for the joint in assembled position.

FIG. 3, an end view of the assembled liners.

FIG. 4, a view of the two portions of the liner prior to assembly.

FIG. 5, a view of a modified construction of a liner.

FIG. 6, an illustration of the lip seal of FIG. 1 shown in the free state prior to assembly.

FIG. 7, a modified type of lip seal mounted into a plastic bearing liner.

Referring to the drawings:

In FIG. 1, a ball 20 having a shank or stud portion with an outwardly tapered neck portion 22 joining with a stud portion 24 is shown, contained in a forged metallic socket 26 having a cylindrical bearing recess 28. Within this bearing recess is a plastic insert assembly generally referred to at 30, this being also shown in enlarged form in FIGS. 2 and 3. Radially outside of the bearing assembly 30 and at each ensmalled end are positioned rings of lubricant-impregnated fibrous material 32 and 34, the entire assembly being held in a compressed condition by an end disc 36 circumferentially staked in position at 38.

A suitable dust cup 40 is shown fastened on the top end of the socket 26 by a clamping ring 42 with a thickened neck portion 44 around the portion 22 of the ball stud having a depending collar 46 which serves to space the undulated or annularly ribbed walls of the dust cup 40 from the entrapment section 48 of the ball and socket assembly in high angle motion.

In FIG. 4, the portions of the plastic ball liner, molded from thermosetting or thermoplastic material having good bearing characteristics, are shown disassembled as parts 50 and 52. These parts are identical in form each having a continuous closed ring end portion 54 with a tapered section 56 which carries on it substantially rectangular cylindrically curved wall sections 58 positioned opposite each other to leave gaps A. The cylindrical wall sections 58 are each provided with an axial slot 60 terminating in a hole 62 which has a function not only in the assembly of parts but also in the assembly and in the transfer of lubrication.

It is preferable that there be an interlock between the portions 58 and as shown in FIG. 4, a small projection 64 at each end of the interlocking walls will interfit with a small recess 66. When the parts are moved axially toward each other, they will interlock as shown in FIG. 2 to become a composite unit with a spherical recess. It will be noted that each extension 58 moves past the equatorial surface of the ball as the parts are joined so that a substantial body of material overlies the heavy load-carrying portions of the ball so that the joint is not weakened by the interlock assembly. The identical nature of the parts 50 and 52, of course, reduces the cost of manufacture. The slots 60 permit the necessary expansion and contraction to allow the parts to be assembled over the ball from each end, that is, from the stud end and the free end and the parts can interlock into a unitary element.

The lubricant, impregnated, resilient rings 32 and 34 are positioned in recesses at each end of the plastic liner formed by the ensmalled ends within the main recess 28 of the socket 26 and the end closure disc 36 may then be inserted under pressure to exert a predetermined breakaway load on the entire assembly, the disc 36 being locked in place by staking or some other suitable system or spinning. The equatorial projections 58, when assembled, form a relatively thick equatorial section shaped to bear against the inner wall of the joint socket and to carry the load of the ball joint.

In FIG. 5, a modified construction is shown for the interlock, each central cylindrical portion of the assembled bearing element 70 having an undulating wall with portions 72 interdigitally interlocking with each other to form an integral unit. Suitable slot openings 74 can be provided in certain of the interlocking projections.

The slot openings 60 and 62 in FIG. 2 and 74 in FIG. 5 serve the function that they allow sufficient expansion to permit the bearing element to be removed from the mold and also permit the overcenter application of each part as it moves toward interlock.

In addition, these slots provide relief for thermal-linear expansion during use since sometimes in strenuous use the temperature of the joint will increase. These splits also allow some movement around the ball and under the pressure of the lubricant, impregnated packing material 32—34 will maintain a tight fit around the ball. In other words, the lubricant material will expand to take up any wear that may result on the parts and thus prolong the service life of the bearing.

The secondary or interior seal for the ball joint itself is illustrated in FIG. 1 as a continuous annular lip 80 which is formed integrally with the plastic bearing inserts 50 and 52 at the polar ends, and in FIG. 6, a sectional view of insert 50 is shown wherein the lip 80 in its free state is shown to be radially inside of the normal surface of the spherical recess which receives the ball so that in assembly as the two parts 50 and 52 are brought together and snapped into engagement, there is an outward pressure on the lips 80 which presses them in close contact with the surface of the ball in the polar areas where contaminants might enter. Thus, in each angular movement of the ball, the lips 80 will tend to wipe it clean. In addition, any lubricant on the ball within the confines of the lips will tend to be retained by the lips so that it does not leak out and escape.

In FIG. 7, a modified structure is shown in which the element 50 is formed with a small slot 82 in which is inserted or molded an annular lip sealing element 84. It may be desirable on some occasions to form the lip seal of a different material than that of the bearing proper and the structure shown in FIG. 7 can accommodate to this requirement. The element 84 can be molded into the bearing inserts in a separate molding operation and if desired, suitable anchoring openings 86 can be provided to insure a locking engagement of the seal with the bearing element.

It will thus be seen that a bearing insert can be created with sealing lips and assembled in such a way that the lips can be under pressure and thus resiliently urged against the ball surface, the split construction of the bearing insert serving the purpose of facilitating the formation of the lip and also facilitating the assembly of the unit thereafter while not detracting from the load carrying capacity of the assembled joint.

I claim:

1. A bearing insert for a ball and socket joint which comprises a pair of annular rings formed of a plastic having good bearing characteristics each ring having an inner spherical recess and having a continuous portion to overlie a portion of the ball of a joint between the equatorial portion and a pole portion, and second interrupted portions overlying equatorial portions of the ball, said second portions of said rings interdigitating to form a substantially continuous wall of bearing material around said ball, said second portions being shaped to lie in contact with a socket wall to form support for a ball in said socket, said second portions being shaped to interlock with each other so as to prevent disassembly when pressed together.

2. A bearing insert as defined in claim 1 in which said second portions of said annular rings are substantially rectangular in shape with a curved contour to form spaced recesses around the rings to receive the second portions of an opposed ring in axial counterposition.

3. A bearing insert as defined in claim 1 in which said second portions of said annular rings are shaped to form a substantially sinuous frontal edge with projecting fingers shaped to fit interdigitally when in axial counterposition to form a spherical recess, said fingers extending over the equatorial area of said recess.

4. A bearing insert as defined in claim 2 in which said second portions are provided with axial slots to provide flexibility during formation, assembly and use of said rings.

5. A bearing insert as defined in claim 1 in which said continuous portions of each ring carries a resilient lip adjacent the open end of the ring extending in free state radially inward of the spherical recess to serve as a seal to exclude contaminants and retain lubricants.

6. A bearing insert as defined in claim 1 in which said continuous portion of each ring has formed integrally therewith a resilient lip adjacent the open end of the ring extending in free state radially inward of the spherical recess to serve as a seal to exclude contaminants and retain lubricants.

7. A ball and socket joint combination comprising:
   a. a socket member having a cylindrical recess open at at least one end,
   b. a ball positioned in said socket having a projecting stud at at least one end extending from said socket,
   c. a bearing insert in said socket comprising a pair of plastic shell members interdigitally joined to form a spherically shaped recess in which said ball is located, said joined shells having an equatorial portion surrounding the ball and in contact with the walls of said socket and having ensmalled ends to leave annular recesses at each end of said socket, and
   d. annularly shaped, lubricant-impregnated, elements of resilient material compressed into said annular recess, the interdigitally joined shells having portions interlocked with each other so as to prevent disassembly.

8. A ball and socket joint as defined in claim 7 in which each of said shell members has circumferentially spaced digital projections equatorially positioned on said ball and one or more openings in said projections to permit circumferential expansion and contraction of said projections when interdigitally interlocked.